United States Patent [19]
Jellinek et al.

[11] 3,928,287
[45] Dec. 23, 1975

[54] COMPOSITION CONTAINING UNSATURATED MONOMERS AND POLYMERIZABLE BY IONIZING RADIATION

[75] Inventors: Karl Jellinek, Letmathe; Rudi Oellig, Duisburg-Meiderich, both of Germany

[73] Assignee: Rutgerswerke Aktiengesellschaft, Frankfurt, Germany

[22] Filed: Aug. 26, 1974

[21] Appl. No.: 500,813

[30] Foreign Application Priority Data
Sept. 6, 1973  Germany............................ 2344843

[52] U.S. Cl.......... 260/47 CB; 117/93.31; 117/123; 117/126; 117/132; 117/138.8; 117/148; 117/155; 252/182; 252/188.3 R; 204/159.22; 260/77.5 B; 260/468; 260/471 C; 260/482 B
[51] Int. Cl.²........................................ C08G 18/00

[58] Field of Search................... 260/77.5 B, 47 CB; 252/188.3 R

[56] References Cited
UNITED STATES PATENTS

| | | | |
|---|---|---|---|
| 3,645,982 | 2/1972 | Lansen............................ | 260/77.5 B |
| 3,783,152 | 1/1974 | Lansen.......................... | 252/188.3 R |
| 3,798,171 | 3/1974 | Ishii et al. ..................... | 252/188.3 R |

Primary Examiner—M. J. Welsh
Attorney, Agent, or Firm—Browne, Beveridge, DeGrandi & Kline

[57] ABSTRACT

A condensation product of a polyepoxide with a dialkanol amine is reacted with a mono-isocyanato-allyl or -methallyl carbamate to form a novel compound which can be mixed with a vinyl monomer, allyl monomer or mixture of such monomers to form a radiation hardenable lacquer composition.

12 Claims, No Drawings

COMPOSITION CONTAINING UNSATURATED MONOMERS AND POLYMERIZABLE BY IONIZING RADIATION

This invention relates to novel compounds and their use in synthetic resin mixtures, which can be polymerized at a high reaction rate by means of high ionizing radiation, especially electron rays.

The synthetic resin mixtures of this invention are useful as surface coatings on a variety of substrates. Preferred substrates are, for example, metals, wood, plastics, paper, asbestos cement, concrete, etc.

It is known in the art that radiation hardening of synthetic resin mixtures possess certain advantages when compared to hardening by cross-linking by the action of heat. Among the advantages are the following. First of all, the radiation hardening permits the use of systems free of solvents, thereby reducing fire hazards and improving compatibility with the environment. Radiation hardening can also result in a savings in energy. Radiation hardening is accompanied by low hardening temperatures, as a result of which, even temperature sensitive substrates can be coated. It is also known that radiation cured coatings quickly harden and yield greatly improved adhesive strength between the substrate and the coating because of a lack of thermal stresses which ordinarily occur on cooling. Finally, radiation hardenable coating systems exhibit considerably longer pot-lives.

German application No. 1,644,817, open to public inspection, describes coating agents containing film-forming organic binders comprising a solution of an α, β-unsaturated resin in vinyl monomers copolymerizable with the resin by ionizing radiation. The resin is an ester condensation product of a polyepoxide and an olefinic, monocarboxylic acid unsaturated in the α, β-position.

It is known that radiation hardenable coatings from these mixtures free of solvents exhibit excellent luster, superior resistance to chemicals and high adhesive strength on various substrates. The coatings, however, require relatively high dosages of ionizing radiation for a satisfactory quick, thorough hardening.

For economic reasons, however, workers in the art strive to limit the intensity of radiation sources used in practical applications. Nowadays, the radiation sources available in continuously operating installations are capable of providing acceleration potentials between 100 and 500 kiloelectron-volts and current intensities of up to 80 mA. As a result, there is a practical limit to the dosage of radiation available. As a measure of radiation dosage, one can use the unit "1 rad". This corresponds to an energy absorption of 100 ergs per gram of absorbing coating.

In order to make curing by electron radiation fully competitive with other lacquering processes, the lacquer industry requires that a lacquer film having a 50μ thickness be capable of being fully hardened when exposed to a radiation dosage of ≦ 2 megarad (≦ 2 × 10⁶ rad).

It can be shown that an ester condensation product produced according to German application No. 1,644,817 from a diglycidyl ether of bisphenol A and acrylic acid mixed with 40% styrene and methyl methacrylate requires at least 3.3 megarad for complete hardening when applied as a 50μ thick film on a phosphatized steel plate. (See comparative experiment 6 hereinafter). In all of the examples set forth in German application No. 1,644,817 radiation dosages of about 5 megarad are used for cross-linking of the films.

Accordingly, there exists a need in the art for compounds which can be formulated into synthetic resin coating mixtures capable of being cured by subjecting the mixtures to radiation. The radiation hardenable coating should be capable of being substantially fully hardened when a 50μ thick layer of the composition is subjected to a radiation dosage of ≦ 2 megarad.

This invention provides a compound comprising the reaction product of at least one half of the hydroxyl groups in a polyol of the formula:

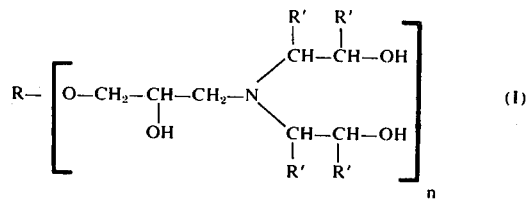

said polyol being the reaction product of an epoxy compound and a dialkanolamine in a stoichiometric ratio between amine hydrogen and epoxy groups, and a monoisocyanatoallyl carbamate or mono-isocyanatomethallyl carbamate of the formulas:

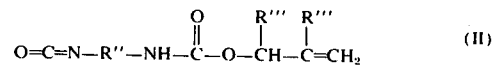

or

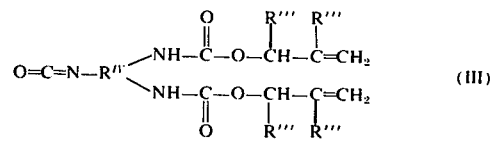

wherein R is a $C_1$–$C_{10}$ alkyl, cycloalkyl, aryl or aralkyl radical having a valency of from 1 to 10; each R' is independently selected from hydrogen, methyl and ethyl; R'' is a $C_1$–$C_{10}$ alkylene, cycloalkylene, arylene or aralkylene group; $R^{IV}$ is a trivalent aryl, carbamate or carbamide group; each R''' is independently selected from hydrogen and methyl and n is a number from 1 to 10.

It has surprisingly been found that the compound of this invention is useful in polymerizable compositions that can be substantially fully hardened when a 50μ thick layer of the composition is subjected to a radiation dosage of ≦ 2 megarad. Accordingly, this invention also provides a composition polymerizable by ionizing radiation, wherein the composition comprises a mixture of the compound of this invention and at least one vinyl or allyl monomer or mixture of such monomers copolymerizable with the compound of this invention by ionizing radiation.

This invention also provides a substrate having thereon a hardened coating of the radiation hardenable composition of this invention.

Additionally, this invention provides for the use of the radiation hardenable composition of this invention as a coating composition. The use comprises the process of (a) applying a layer of the composition of this invention to a substrate; and (b) irradiating said layer to thereby harden the composition, wherein the composition is such that a 50μ thick layer thereof is capable of being hardened when subjected to a radiation dosage of ≦ 2 megarad.

The intermediate products of formula (I) can be prepared by reacting polyepoxy compounds with dialkanolamines, such as for example, diethanolamine, diisopropanolamine or diisobutanolamine, whereby 1 mole dialkanolamine is made to react per epoxy group. The reaction is exothermic, and the reaction temperature is maintained at about 80°–120°C until completion of the reaction.

As polyepoxide compounds, one can employ basically all compounds that contain at least one epoxy group per molecule. These compounds can be prepared by the reaction of alcohols, phenols, polyphenols or polyalcohols with epichlorohydrin, for example, according to U.S. Pat. Nos. 2,467,171, 2,538,072, 2,558,959 and 2,694,694, or by the reaction of unsaturated compounds with organic peracids as described in a number of references including U.S. Pat. Nos. 2,853,498, 2,853,499 and 2,829,135.

The reaction products of phenol, cresol, xylenol, alkyl phenols or of bisphenol A with epichlorohydrin in an alkaline medium, as well as the glycidyl ether of resorcinol, hydroquinone, phenol novolacks, butyl alcohol, allyl alcohol, 2-ethyl hexanol, butandiol, hexandiol, glycerin, trimethylol propane and neopentyl glycol, are preferred. Preferred representatives of the unsaturated compounds epoxidized by peracids are octene oxide; vinylcyclohexenedioxide; 3;4-diepoxy-6-methyl-tetrahydrobenzyl-3'; 4'-diepoxy-6'-methyl-tetrahydrobenzoate and others.

The production of the intermediate products of formulas (II) and (III) is accomplished by molar reaction of diisocyanates with allyl or methallyl alcohol, or by reaction of 1 mole triisocyanate with 2 moles of allyl or methallyl alcohol.

Suitable diisocyanates for the production of the compounds according to the above structural formula are, for example, toluene diisocyanate, isophorone diisocyanate; 4,4',4''-triisocyanato-triphenylmethane; 4,4'-diisocyanato-diphenylmethane; 1,6-diisocyanato-hexane; m-xylylene-diisocyanate; N,N',N''-triisocyanato-biuret and others.

As copolymerizable vinyl or allyl monomers one can employ, among others, styrene, esters of acrylic and methacrylic acid, vinyl toluene, divinyl benzene and diallyl malenate. Preferably, the composition of this invention comprises about 20–80 parts by weight of the monomers and about 80–20 parts by weight of the compounds of this invention.

The composition of this invention can be applied to any desired substrate, and then lead past an electron accelerator as the source of radiation at such a rate that substantially complete hardening will take place. The maximum throughput velocity will depend on the capacity of the electronic accelerator. As the following examples demonstrate, twice as high throughput performances are achieved according to this invention as compared with compositions disclosed in German application No. 1,644,817 under the same radiation conditions.

The composition of this invention comprising synthetic resin mixtures can be hardened by radiation to produce films having high luster, excellent mechanical characteristics and resistance to chemicals comparable to thermally hardened epoxy resin films.

This invention will be more fully understood by reference to the following examples in which all parts, proportions and percentages are by weight unless otherwise indicated.

EXAMPLES OF THE PRODUCTION OF UNSATURATED MONOISOCYANATES (PRELIMINARY PRODUCTS)

Preliminary Product A: (Reaction Product of Allyl Alcohol and Toluene Diisocyanate)

To a three-necked flask equipped with stirrer, reflux cooler, thermometer and dropping funnel, 3700 g of toluene diisocyanate are added and heated to 80°C. Within 1 hour and with simultaneous cooling, 1300 g of allyl alcohol are added drop by drop. At the same time one must be careful that the temperature does not rise above 90°C. After that, this is kept for 1 hour at 80°C.

There results a viscous product having the following characteristics:
Viscosity at 25°C: 450 cps
Density at 25°C: 1.2 g/ml
Refractive index $n_D$ 25: 1.5615
Isocyanate content: 18.4 (theoretical: 19.2%)

Preliminary Product B: (Reaction Product of Desmodur L with Allyl Alcohol)

To a three-necked flask equipped with stirrer, thermometer, reflux cooler and dropping funnel, 875 g of "Desmodur" L (75% in ethyl acetate) are added and heated to 80°C. Within 1 hour, 116 g of allyl alcohol (2 moles) are added drop by drop at 80°–90°C, and reacted at 90°C for 1 hour. After that, the ethyl acetate is distilled off in a vacuum up to 150°C. A product results having a softening range from 106°–112°C. (KS)
Isocyanate content: 5.4% (theoretical: 5.8%)

"Desmodur L" is the German tradename for a reaction product made from 1 mole trimethylol propane and 3 moles toluene diisocyanate, which is present as a 75% solution in ethyl acetate and which has an NCO content of about 13%.

Preliminary Product C: (Reaction Product from Desmodur N with Allyl Alcohol)

To a three-necked flask equipped with a stirrer, thermometer, dropping funnel and reflux cooler, 638 g of Desmodur N 75% in xylene/ethyl glycol acetate 1:1 (1 mole) are added and heated to 80°C. Within 1 hour, 116 g of allyl alcohol (2 moles) are added drop by drop at 80°–90°C. Subsequently this is rereacted for 1 hour at 90°C.

After distilling away the solvent mixture in a vacuum up to 150°C, a product with a softening range from 23°–27°C (KS) will result.
The NCO content amounts to: 6.7% (theoretical: 7.1%)

"Desmodur N" is the tradename for a 75% solution of N,N',N''-tris-(isocyanatohexamethylene)-biuret in xylene/ethyl glycol acetate (1:1).

EXAMPLE 1

To a three-necked flask, equipped with stirrer, thermometer, reflux cooler and dropping funnel, there are added 375 g of diglycidyl ether of bisphenol A (1 mole) having an epoxy equivalent of 187 and 210 g of diethanolamine (2 moles). The reaction starts at ambient temperature and reaches 120°C toward the end of the reaction. When the liberation of heat subsides, this is rereacted for 1 hour at 120°C. A semi-solid, intermediate product having an epoxy value of 0.01 will result.

585 g of this intermediate product are dissolved in 880 g of xylene. 935 g of preliminary product A are added at 120°C within 30 minutes and subsequently rereacted for 1 hour at 120°C. The solvent is removed in a vacuum up to 160°C sump temperature. A product having the following analysis results:

Epoxy value: <0.01
Softening point: 90°C (KS)

1000 g of this resin-like intermediate product are dissolved in 600 g of a mixture of styrene and methyl methacrylate (1:1) to form a liquid binder, the viscosity of which as measured at 20°C in a DIN (DIN = German industrial standard) beaker with 4 mm nozzle is 130 sec.

The results of the radiation hardening of this binder in a thin layer by ionizing electron rays are summarized in Example 6.

EXAMPLE 2

To a three-necked flask, equipped with stirrer, thermometer, reflux cooler and dropping funnel, 255 g of resorcinol-diglycidyl ether (1 mole) and 210 g of diethanolamine (2 moles) are added. The reaction begins at ambient temperature, and toward the end of the reaction it reaches 120°C. Under certain circumstances cooling during the reaction will be necessary. After completion of the reaction, this is rereacted for 1 hour at 120°C. A highly viscous, intermediate product with an epoxy value of <0.01 results.

465 g of this intermediate product are dissolved in 700 g of xylene, 1490 g of preliminary product A are added slowly at a temperature of 120°C within 45 minutes, and the mixture is subsequently rereacted at 120°C for 1 hour. After that, the xylene is distilled off in a vacuum up to a sump temperature of 160°C.

One will obtain a resin-like product having a melting point of 82°C (KS).

1000 g of this product are dissolved in 650 g of a mixture of 60% methyl methacrylate and 40% vinyl toluene to form a lacquer binder, the viscosity of which at 20°C in a DIN beaker with 4 mm nozzle is 125 sec.

The results of the electron hardening of the binder in a thin layer are summarized in Example 6.

EXAMPLE 3

To a three-necked flask, equipped with thermometer, stirrer, reflux cooler and dropping funnel, 160 g of phenyl-glycidyl ether are heated to 80°C, and 105 g of diethanolamine are added drop by drop within 2 hours at 80°–100°C. The mixture is subsequently rereacted for 1 hour more. A viscous product with an epoxy value of <0.01 will result.

265 g of this intermediate product are dissolved in 500 g of xylene and heated to 100°C. Within 1 hour, 2360 g of preliminary product B are added, and rereacted for 1 hour at 100°C. After that, the xylene is distilled off in a vacuum up to a sump temperature of 150°C, as a result of which a product having a melting point of 52°C will be obtained.

650 g of the above resin-like product are dissolved in 350 g of a mixture of styrene and methyl methacrylate (1:1). One will obtain a binder having a viscosity at 20°C of 135 seconds in a DIN beaker with 4 mm nozzle.

The results of the radiation hardening of the binder are shown in Example 6.

EXAMPLE 4

To a three-necked flask, equipped with stirrer, thermometer, reflux cooler and dropping funnel, 307 g of hexandiol-diglycidyl ether are added and heated to 80°C. Subsequently, 250 g of diisopropanolamine are added drop by drop within 2 hours at 80°–100°C and the mixture rereacted for 1 hour at 80°–100°C. A highly viscous product with an epoxy value of <0.01 will result.

517 g of the product thus produced are dissolved in 1000 g of xylene and reacted at 100°C with 2560 g of preliminary product C for 2 hours. A product having a melting point of 65°C (KS) will result.

1000 g of this resin-like product are dissolved in 650 g of a mixture of methacrylic acid methyl ester (60%) and diallylmalenate (40%) to form a binder with a viscosity at 20°C in a DIN beaker (4 mm nozzle) of 128 sec.

The results of the radiation hardening of this binder are summarized in Example 6.

EXAMPLE 5

(Comparative Example)

To a three-necked flask, equipped with stirrer, thermometer and reflux cooler, 1350 g of diglycidyl ether of bis-phenol A having an epoxy equivalent of 185, 2190 g of methacrylic acid and 2.3 g of hydroquinone are added. The mixture is brought slowly to 120°C and kept at this temperature for 5½ hours. Subsequently, the excess methacrylic acid is removed by distillation under a full vacuum of a water jet pump. The resulting product is tough in the manner of a resin, and it exhibits the following properties:

Acid number: 25.8 mg KOH/g
Saponification number: 136 mg KOH/g

From this intermediate product a binder according to DOS No. 1,644,817 is produced having a viscosity at 20°C in a DIN beaker (4 mm nozzle) of 120 sec., by dissolution in a mixture of methacrylic acid methyl ester and styrene (1:1). The content of vinyl monomer mixture at the same time amounts to 40%.

The results of the treatment of this binder with ionizing electron rays in a thin layer are summarized in Example 6.

EXAMPLE 6

The binders of Examples 1–5 are applied to phosphatized steel metal sheets at a thickness of 50μ by means of a suitable lacquer application device, and are guided at a distance of 20 cm past an electron ray source at a variable speed of passage. The potential of the electron ray generator is 320 Kilo-electron-volts, and the current intensity is 50 mA.

The linear speed of passage of the sample metal sheets is increased each time for such a length of time until a clear decrease of the technical lacquer characteristics of the films points out the minimum dosage of radiation required for extensive cross-linking of the binders.

The results obtained have been summarized in the following table:

TABLE

RESULTS OF EXPERIMENTS OF CROSS-LINKING WITH ELECTRON RAYS IN A THIN LAYER

| Belt velocity in m/minute | 7 | | 15 | |
|---|---|---|---|---|
| Dose of radiation in Mrad | 9 | | 4.2 | |
| Surface quality of the films | tack free | pendulum hardness* (sec) | tack free | pendulum hardness (sec) |
| Product according to Example 1 | + | 180 | + | 180 |
| Product according to Example 2 | + | 176 | + | 176 |
| Product according to Example 3 | + | 160 | + | 160 |
| Product according to Example 4 | + | 157 | + | 157 |
| Product according to Example 5 (comparative example) | + | 160 | + | 160 |

| Belt velocity in m/minute | 20 | | 25 | |
|---|---|---|---|---|
| Dose of radiation in Mrad | 3.3 | | 2.5 | |
| Surface quality of the films | tack free | pendulum hardness (sec) | tack free | pendulum hardness (sec) |
| Product according to Example 1 | + | 180 | + | 180 |
| Product according to Example 2 | + | 175 | + | 176 |
| Product according to Example 3 | + | 160 | + | 160 |
| Product according to Example 4 | + | 160 | + | 157 |
| Product according to Example 5 (comparative example) | + | 155 | + | 60 |

| Belt velocity in m/minute | 30 | | 35 | |
|---|---|---|---|---|
| Dose of radiation in Mrad | 2.1 | | 1.8 | |
| Surface quality of the films | tack free | pendulum hardness (sec) | tack free | pendulum hardness (sec) |
| Product according to Example 1 | + | 178 | + | 176 |
| Product according to Example 2 | + | 176 | + | 174 |
| Product according to Example 3 | + | 155 | + | 150 |
| Product according to Example 4 | + | 150 | + | 140 |
| Product according to Example 5 (comparative example) | − | 39 | − | — |

| Belt velocity in m/minute | 40 | | 45 | |
|---|---|---|---|---|
| Dose of radiation in Mrad | 1.6 | | 1.4 | |
| Surface quality of the films | tack free | pendulum hardness (sec) | tack free | pendulum hardness (sec) |
| Product according to Example 1 | + | 160 | + | 46 |
| Product according to Example 2 | + | 170 | + | 86 |
| Product according to Example 3 | + | 142 | + | 100 |
| Product according to Example 4 | + | 135 | + | 75 |
| Product according to Example 5 (comparative example) | − | — | − | — |

*)according to Konig, DIN 53,157

As used herein, the expression "vinyl monomer" refers to polymerizable organic compounds containing the $CH_2 = CH—$ group and polymerizable compounds containing this group substituted in the α-position (i.e. vinylidene compounds).

It will be understood that the $n$ in formula (I) can be an average number representing a number of compounds of this formula in admixtures, and therefore, may or may not be an integer.

Among the preferred radicals standing for $R^{IV}$ the following are mentioned:

$R^{IV}$ means a trivalent aryl group of the formula

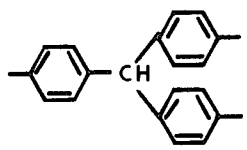

or a trivalent carbamate group of the formula

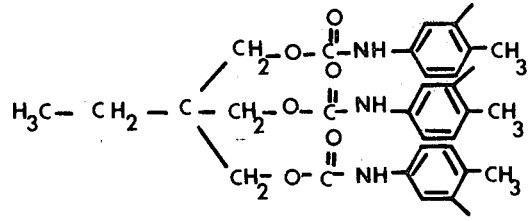

or a trivalent carbamide group of the formula

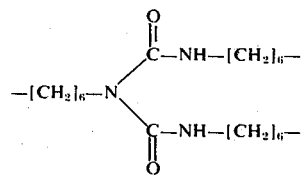

What is claimed is:

1. A composition polymerizable by ionizing radiation, said composition comprising a mixture of at least one vinyl monomer, at least one allyl monomer or a mixture of at least one vinyl monomer and allyl monomer, and a compound copolymerizable with said monomers, said compound comprising the reaction product of (A) at least half of the hydroxyl groups in a polyol of the formula:

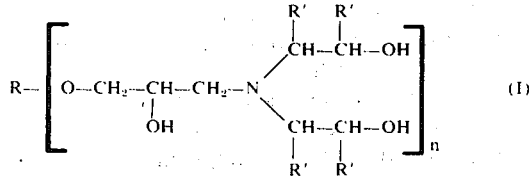

said polyol being the reaction product of an epoxy compound and a dialkanolamine in a stoichiometric ratio between amine hydrogen and epoxy groups, with (B) a monoisocyanato-allyl carbamate or monoisocyanato-methallyl carbamate of the formulas:

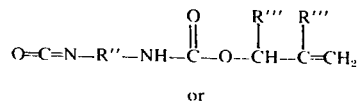    (II)

or

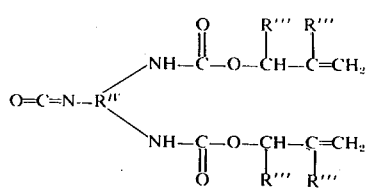    (III)

wherein R is a $C_1$–$C_{10}$ alkyl, cycloalkyl, aryl or aralkyl radical having a valency of from 1 to 10; each R' is independently selected from hydrogen, methyl and ethyl; R" is a $C_1$–$C_{10}$ alkylene, cycloalkylene, arylene or aralkylene group; $R^{IV}$ is a trivalent aryl, carbamate or carbamide group; each R''' is independently selected from hydrogen and methyl and n is a number from 1 to 10.

2. Composition according to claim 1, wherein a 50μ thick layer of said composition is hardenable by radiation of ≦ 2 Megarad.

3. Composition according to claim 2 in which the monomer is styrene, methyl methacrylate, an ester of acrylic or methacrylic acid, vinyl toluene, divinyl benzene, diallyl maleate, or an ester of allyl alcohol with a mono- or polycarboxylic acid.

4. Composition according to claim 3 in which said monomer is an ester of acrylic or methacrylic acid with a monovalent or multivalent alcohol.

5. Composition according to claim 3 in which said compound comprises about 80–20 parts by weight of the composition and said monomer comprises about 20–80 parts by weight of said composition.

6. A composition according to claim 1 wherein $R^{IV}$ is a trivalent aryl group of the formula

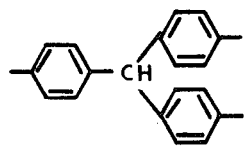

7. A composition according to claim 1 wherein $R^{IV}$ is a trivalent carbamate group of the formula

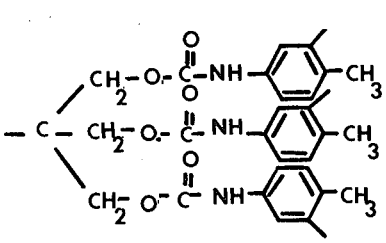

8. A composition according to claim 1 wherein $R^{IV}$ is a trivalent carbamide group of the formula

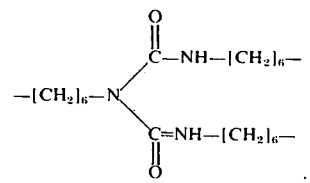

9. A composition according to claim 1 wherein said polyol is the reaction product of diglycidyl ether of bisphenol A having an epoxy equivalent of 187 and diethanolamine.

10. A composition according to claim 1 wherein said polyol is the reaction product of resorcinol diglycidyl ether and diethanol amine.

11. A composition according to claim 1 wherein said polyol is the reaction product of phenyl-glycidyl ether and diethanolamine.

12. A composition according to claim 1 wherein said polyol is the reaction product of hexandiol-di-glycidyl ether and diisopropanolamine.

* * * * *